(12) United States Patent
Vincent et al.

(10) Patent No.: US 8,347,302 B1
(45) Date of Patent: Jan. 1, 2013

(54) SYSTEM-AWARE RESOURCE SCHEDULING

(75) Inventors: Pradeep Vincent, Issaquah, WA (US); Swaminathan Sivasubramanian, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 1008 days.

(21) Appl. No.: 12/248,770

(22) Filed: Oct. 9, 2008

(51) Int. Cl.
*G06F 9/50* (2006.01)

(52) U.S. Cl. ......................... 718/104; 718/103

(58) Field of Classification Search ............... None
See application file for complete search history.

(56) References Cited

U.S. PATENT DOCUMENTS

| | | | |
|---|---|---|---|
| 6,212,562 B1 | 4/2001 | Huang | |
| 6,434,631 B1 | 8/2002 | Bruno et al. | |
| 6,446,126 B1 | 9/2002 | Huang | |
| 6,714,962 B1 | 3/2004 | Helland et al. | |
| 6,779,181 B1 | 8/2004 | Yu et al. | |
| 6,820,117 B1 | 11/2004 | Johnson | |
| 6,871,011 B1 | 3/2005 | Rahman et al. | |
| 7,197,577 B2 | 3/2007 | Nellitheertha | |
| 7,305,537 B1 | 12/2007 | Moore et al. | |
| 7,320,131 B1 * | 1/2008 | O'Toole, Jr. ................ | 718/104 |
| 7,757,013 B1 * | 7/2010 | Lawson et al. ............... | 710/15 |
| 7,761,529 B2 * | 7/2010 | Choubal et al. .............. | 709/212 |
| 2005/0022173 A1 * | 1/2005 | Kanade ....................... | 717/140 |
| 2005/0044301 A1 | 2/2005 | Vasilevsky et al. | |
| 2005/0080841 A1 * | 4/2005 | Balazich et al. ............. | 709/200 |
| 2005/0120160 A1 | 6/2005 | Plouffe et al. | |
| 2006/0200821 A1 | 9/2006 | Cherkasova et al. | |
| 2006/0253621 A1 * | 11/2006 | Brewer et al. ................ | 710/40 |
| 2007/0022100 A1 * | 1/2007 | Kitsuregawa et al. ......... | 707/3 |
| 2007/0130387 A1 | 6/2007 | Moore et al. | |
| 2007/0240160 A1 | 10/2007 | Paterson-Jones et al. | |
| 2008/0016310 A1 * | 1/2008 | Ghosal et al. ................ | 711/167 |
| 2008/0229318 A1 * | 9/2008 | Franke ........................ | 718/104 |

OTHER PUBLICATIONS

Barham, Paul, et al., "Xen and the Art of Visualization," University of Cambridge Computer Laboratory, SOSP'03, Oct. 19-22, 2003, Bolton Landing, New York, USA.
Shakshober, John D., "Choosing an I/O Scheduler for Red Hat Enterprise Linux 3 and the 2.6 Kernel," Red Hat Magazine, Issue #8, Jun. 2005, [http://www.redhat.com/magazine/008jun05/features/schedulers].
Jones, M. Tim, "Inside the Linux Scheduler: The latest version of this all-important kernel component improves scalability," IBM, Jun. 30, 2006, [http://www.ibm.com/developerworks/linux/library/l-scheduler/].

* cited by examiner

*Primary Examiner* — Eric Coleman
(74) *Attorney, Agent, or Firm* — Novak Druce + Quigg LLP

(57) ABSTRACT

Technology is provided to manage requests for physical resources in computing systems using system-aware scheduling techniques. Transactions having two or more dependent requests for a physical resource are identified by the computing system. Information identifying the requests as part of a dependent transaction is passed with the requests for the physical resource. In at least one mode of operation, a scheduler corresponding to the physical resource allocates submission of the requests to the physical resource using the dependent transaction information.

30 Claims, 8 Drawing Sheets

SYSTEM-AWARE RESOURCE SCHEDULING

BACKGROUND

In most computing systems a CPU executes multiple applications, requiring different applications to share access to the system's physical resources. If the availability of the resources exceeds the demands of the requesting applications, allocating the system's resources may be as simple as providing access to the resource when access is requested by an application. In practice however, system resources are generally not provisioned to the extent necessary for unrestrained access by all requesting applications. Among the functions of most operating systems is the allocation of system resources among requesting applications that are executing on the CPU. For example, many operating systems include a CPU scheduler to allocate processing time slices or windows to applications currently being executed. Resource schedulers are also used to manage requests from applications for physical resources. For instance, most operating systems include one or more input/output (I/O) schedulers to manage the submission of I/O requests to the I/O devices such as disk drives.

Various objectives are often considered in the design of resource schedulers. For example, I/O schedulers may be designed to provide fairness among different requesting applications. Some I/O schedulers utilize different I/O queues for the I/O requests of different applications and a round-robin selection of requests from each queue to ensure each application is serviced. I/O schedulers may also be designed with the objective of maximizing disk throughput and/or minimize I/O latency for the storage system. Anticipatory schedulers generally attempt to optimize disk throughput and quality of service (QoS) guarantees. Deadline schedulers generally attempt to minimize I/O latencies. To address disk throughput, first-in first-out (FIFO) queues are often used whereby the first request received is the first submitted by the scheduler to the storage system. Schedulers may also estimate disk seek times for I/O requests (e.g., using disk spatial locality) to improve utilization of the disk. Heuristics are used by some schedulers to wait for additional requests from an application after processing a first request in anticipation that another request from the same process may be received. Such schemes can improve disk utilization where the application I/O requests are for data with disk spatial locality. QoS guarantees can be used in scheduling requests such that certain applications or domains are guaranteed some minimum level of resource availability, such as a minimum I/O throughput or bandwidth.

DETAILED DESCRIPTION

Figure 1:
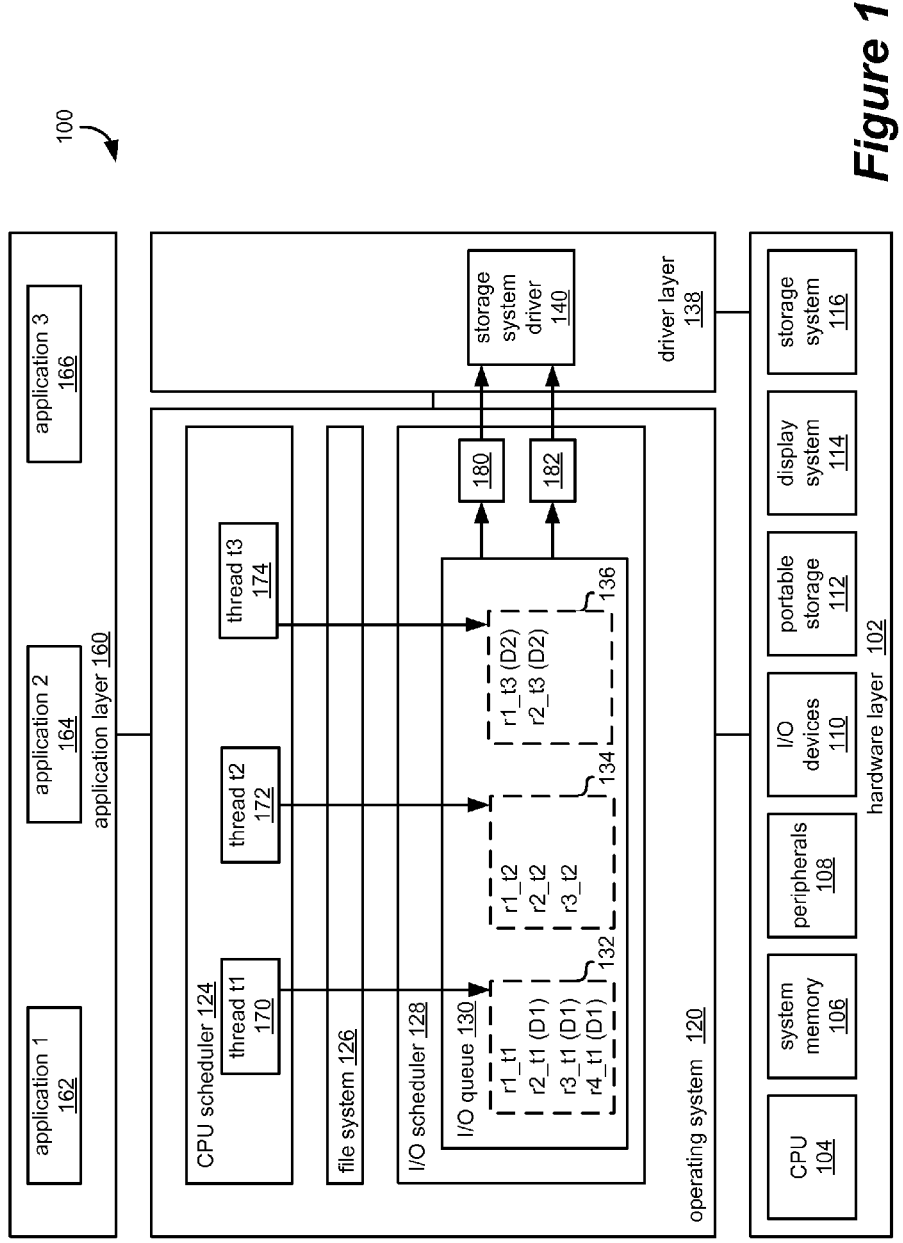
FIG. 1 is a block diagram of a computing system in accordance with one embodiment that depicts the scheduling of requests for limited physical resources within the computing system.

Technology is described herein to manage requests for physical resources in computing systems using system-aware scheduling techniques. In one or more embodiments, transactions having two or more dependent requests for a physical resource are identified by the computing system. Information identifying the requests as part of a dependent transaction is passed with the requests for the physical resource. In at least one mode of operation, a scheduler corresponding to the physical resource allocates submission of the requests to the physical resource using the dependent transaction information.

An operating system CPU scheduler manages the execution of a plurality of applications by a central processing unit in one embodiment. Active threads from the applications are allocated processing time windows at the CPU. The threads submit requests for a physical resource which are passed to the resource scheduler. Before submission to the resource scheduler, any request corresponding to a dependent transaction is identified and an identifier for the transaction is inserted into the request by the application or file system. The CPU scheduler is operable to set the resource scheduler between at least two modes of operation. In a first mode, the resource scheduler schedules the requests independent of any dependent transaction information. In a second mode, the resource scheduler accesses the dependent transaction information so that requests corresponding to dependent transactions are given priority.

In one embodiment, a method of scheduling requests for resources in computing systems is provided that includes receiving a plurality of resource requests designating one or more physical resources. The plurality of requests includes two or more resource requests having a dependent transaction identifier and at least one resource request not having a dependent transaction identifier. The plurality of requests is placed into a queue. The dependent transaction identifier is used to identify that the two or more resource requests are part of a first dependent transaction. The two or more resource requests are provided to the one or more physical systems prior to providing the at least one resource request based on determining that the two or more I/O requests are part of the first dependent transaction.

Another embodiment includes a method of managing input/output (I/O) requests for physical resources in computing systems that includes adding a first identifier to each of a first plurality of I/O requests to indicate that the I/O requests are part of a first dependent transaction. The first plurality of I/O requests and a second plurality of I/O requests are received at an I/O scheduler providing I/O requests to one or more storage systems. Using the first identifier, it is determined that the I/O requests of the first plurality are part of the first dependent transaction. In response to this determination, the first plurality of I/O requests is provided to the one or more storage systems prior to the second plurality of I/O requests.

FIG. 1 is a block diagram of a computing system in accordance with one embodiment of the disclosed technology depicting the scheduling of requests for limited physical resources within the system. The hardware layer 102 of the computing system includes a central processing unit (CPU) 104, system memory 106, peripheral devices 108, input/output (I/O) devices 110, portable storage 112, display system 114 and storage system 116. The hardware components can be connected via a single bus or through one or more data transport means. In one example, CPU 104 and system memory 106 may be connected via a local microprocessor bus, and peripherals 108, I/O devices 110, portable storage 112, display system 114, and storage system 116 may be connected via one or more input/output buses.

CPU 104 is described as a single processor for convenience but may contain a plurality of microprocessors for configuring the computing system as a multiprocessor system. System memory 106 stores instructions and data for execution by CPU 104. If the technology described herein is wholly or partially implemented in software, memory 106 will store the executable code when in operation. In one embodiment, memory 106 may include banks of dynamic random access memory, high speed cache memory, flash memory, nonvolatile memory, or other storage elements. For example, memory 106 can store code to program CPU 104. CPU 104 can perform the methods described herein based on the stored code.

Peripheral devices 108 may include any type of computer support device, such as an input/output interface, to add additional functionality to the computing system. For example, peripheral devices 108 may include a network interface for connecting the computer system to a network, a modem, a router, a wireless communication device, etc. Input/output devices 110 provide a portion of a user interface, and may include a keyboard, or pointing device (e.g. mouse, track ball, etc.). In order to display textual and graphical information, the computing system optionally includes an output display system 114, which may include a video card and monitor, for example. Output devices can include speakers, printers, network interfaces, etc. Portable storage device 112 operates in conjunction with a portable nonvolatile storage medium, such as a floppy disc, CD-RW, flash memory card/drive, etc., to input and output data and code to and from the computing system.

Storage system 116 is a nonvolatile storage device in one embodiment for storing data and instructions for use by CPU 104. The non-volatile storage device may be implemented with a magnetic disc drive, optical disc drive or solid-state drive. In another embodiment, storage system 116 includes a plurality of non-volatile storage devices. For example, the storage system can be a networked storage subsystem. Where the storage system is networked, a network interface and bus connection may connect the CPU and storage system. In one embodiment, storage system 116 stores the system software that implements the technology described herein for purposes of loading to system memory 106.

The components depicted in the computer system of FIG. 1 are those typically found in computing systems suitable for use with the technology described herein, and are intended to represent a broad category of such computer components that are well known in the art. Other embodiments may not include all of the hardware components shown in FIG. 1 and/or may include additional hardware components to those shown. The computing system can be a personal desktop computer, workstation, server, mini computer, main frame, laptop computer, handheld computer, mobile computer, cellular telephone, television set-top box, or other computing device. Many different bus configurations, network platforms, operating systems can be used. The technology described herein is not limited to any particular computing system.

An operating system (OS) 120 is implemented for management of the computing system 100. The operating system interfaces between the hardware layer and application layer 160 for management of the various physical resources of the computing system. The operating system is comprised of operating system 122 which includes a CPU scheduler 124 that allocates usage of CPU to the application layer 160. In FIG. 1, three exemplary applications 162, 164, and 166 are shown for explanatory purposes although any number of applications may be executed by the computing system. The operating system includes resource schedulers that reside between a core kernel layer/file system layer 126 and a driver layer 138 including various hardware drivers for supporting the hardware components coupled to the computing system. A single I/O resource scheduler 128 and device driver 130 for supporting storage system 116 are depicted in FIG. 1 for clarity of explanation. Many systems will include additional schedulers and drivers for other resources. In some systems, the driver layer forms part of the operating system 120.

In FIG. 1, applications 162, 164, and 166 are depicted in an active executing state whereby CPU processing time is being allocated to a process for each application. An active thread is open in operating system 122 for each application process. The operating system receives processing requests from each application and uses CPU scheduler 124 to allocate processing time to each thread, depicted within the scheduler as thread t1 (application 1), thread t2 (application 2) and thread t3 (application 3). While each application has a single active thread in FIG. 1, more than one thread may be active for a given application at a given time. The CPU scheduler can use various techniques for allocating processing time slices or windows to the different application threads. For example, round-robin processing can be used in a fairness based allocation of processing time for each application in one embodiment. Quality of service (Qos) techniques can be employed whereby particular applications are guaranteed a certain amount of processor usage, etc. Heuristics can be maintained to more efficiently schedule the different processes based on their past processing behaviors.

The applications at the highest layer submit resource requests to the operating system kernel and file system 126. These resource requests are in turn submitted from the file system to the appropriate resource scheduler. The file system provides a layer of abstraction between the physical system and software applications. I/O requests for the storage system 116, for example, can be translated from object or file-based I/O requests at the application level to physical location-based I/O requests that are submitted to the storage system. The resource scheduler determines the sequence, number and nature by which the requests are submitted to the physical resource via the underlying hardware driver. In FIG. 1, an exemplary execution environment is shown with CPU scheduler 124 managing execution of thread t1, thread t2, and thread t3 by CPU 104. In the depicted state, thread t1 includes four outstanding I/O requests for the storage system 116 which are denoted r1_t1, r2_t1, r3_t1 and r4_t1 at I/O queue 130. Thread t2 includes three outstanding I/O requests for storage system 116 denoted r1_t2, r2_t2 and r3_t2. Thread t3 includes two outstanding I/O requests for storage system 116 denoted r1_t3 and r2_t3.

In the embodiment of FIG. 1, I/O queue 130 includes optional process queues 132, 134, 136 corresponding to the active threads managed by the CPU scheduler. Additional process queues are allocated for other active threads as needed. In one embodiment, the I/O scheduler uses the process identifier (PID) to identify the corresponding process and place the request into the appropriate queue. In another embodiment, the I/O scheduler uses a single queue for the requests from different processes. In one embodiment, a hash table can be utilized to organize I/O requests by process.

I/O requests r2_t1, r3_t1 and r4_t1 submitted by thread t1 each include dependent transaction identifier D1. The dependent transaction identifier identifies each of the individual I/O requests as part of or corresponding to a first dependent transaction. The identifier signifies that process thread t1 from which the I/O requests originate will be idle or prevented from further CPU processing pending completion of each request corresponding to the dependent transaction. I/O requests r1_t3 and r2_t3 submitted by thread t3 include a dependent transaction identifier D2, identifying each of the individual I/O requests as part of or corresponding to a second dependent transaction. The identifier D2 signifies that each I/O request having the D2 identifier must be completed before process thread t3 can undergo further execution.

I/O scheduler 128 includes two operational modes for allocating I/O requests to the storage system 116. In a first operational mode represented by box 180, the I/O requests are provided to the storage system using a first scheduling algorithm based on one or more of fairness scheduling, I/O throughput, optimal I/O latency and quality of service guarantees associated with the requests. In a second operational mode represented by box 182, the I/O scheduler considers whether any pending I/O requests are associated with a dependent transaction. Based on this information, the I/O scheduler attempts to give priority to sets of I/O requests corresponding to selected dependent transactions in order to complete the transactions and free the requesting applications for further processing by the CPU.

Figure 2:
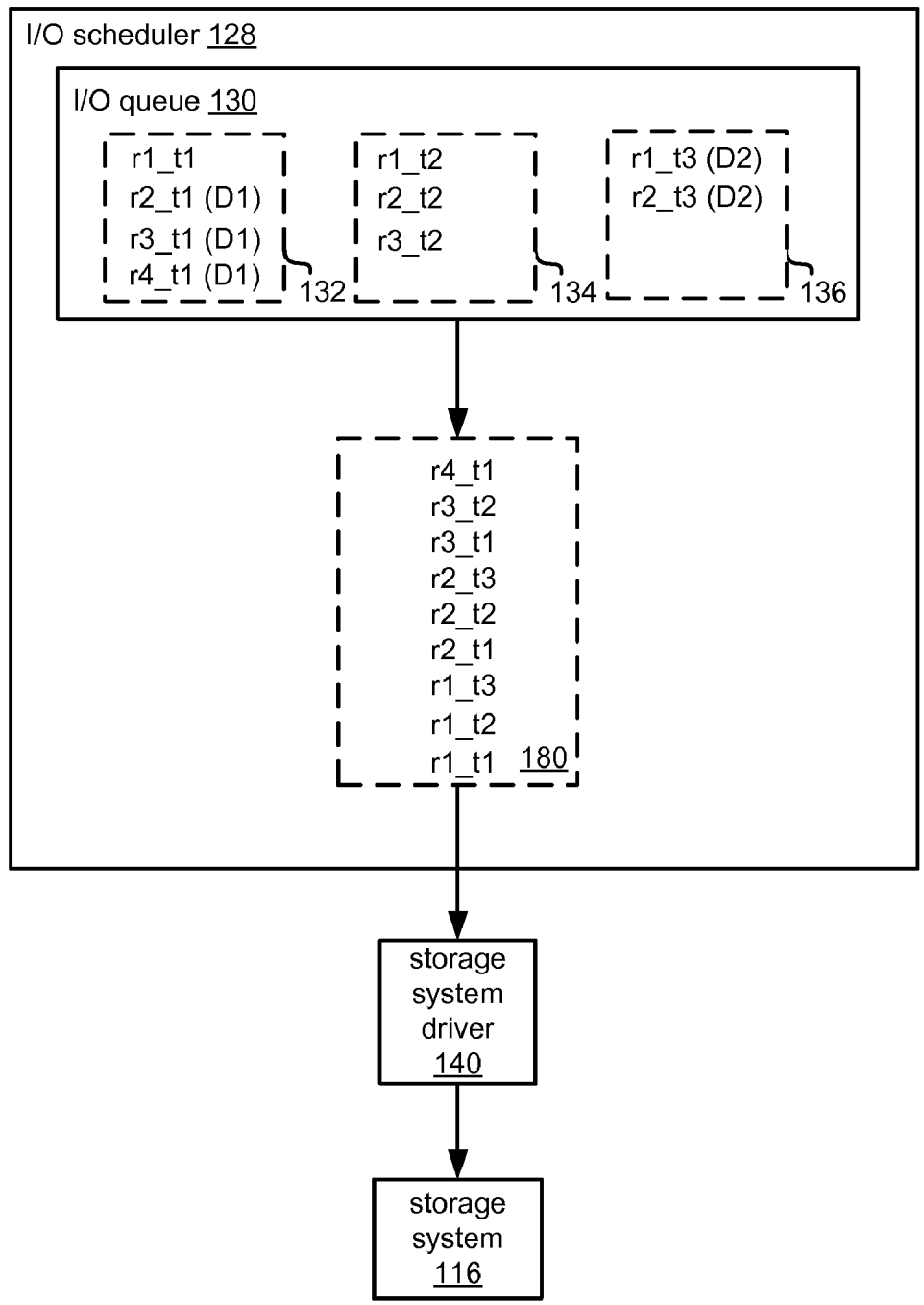
FIG. 2 is a block diagram of a computing system illustrating an exemplary first scheduling operational mode for a resource scheduler in accordance with one embodiment.

FIG. 2 illustrates an exemplary first scheduling operational mode 180 of I/O scheduler 128. In the depicted scheduling mode, the I/O scheduler uses a first-in/first-out round robin scheduling algorithm to ensure that each process submitting I/O requests is being serviced. The I/O scheduler selects the first received I/O request from one process queue, then the first received I/O request from the next process queue and so on. After selecting one I/O request from each process queue, the I/O scheduler proceeds back to the first process queue to select the next received I/O request.

In FIG. 2, the order in which I/O requests are provided to storage system 116 via driver 140 is illustrated conceptually in box 180 representing the first operational mode. Box 180 is provided merely for explanatory purposes to show the order in which the I/O requests are provided to the storage system 116. Within box 180, the scheduling order is set forth in a list where the first I/O request that will be submitted to the storage system is at the bottom of the list and the last I/O request that will be submitted is located at the top of the list. The I/O scheduler begins with process queue 132 corresponding to thread t1. The first I/O request received from thread t1, I/O request r1_t1, is provided to the storage system. The I/O scheduler then selects the first I/O request received from thread t2, I/O request r1_t2, and then the first I/O request received from thread t3, I/O request r1_t3. After providing I/O request r1_t3 to driver 140, the scheduler returns to process queue 132 and submits the next I/O request to be received from thread t1, I/O request r2_t1. The I/O scheduler continues in this fashion until each I/O request has been provided to the storage system 116. The I/O scheduler receives a reply from driver 140 when each request has been completed by storage system 116. When the reply is received, the I/O scheduler removes the corresponding I/O request from I/O queue 130.

The first operational mode described in FIG. 2 is exemplary only and other techniques can be employed for the first operational mode. In one embodiment, requests are allocated based on optimal utilization of the storage system 116 in addition to or in place of fairness scheduling. In one example, the I/O scheduler attempts to more efficiently process I/O requests by identifying I/O requests with spatial locality on the disk(s) of the storage system to reduce seek times involved in accessing the appropriate memory locations. The I/O scheduler can determine the start address and byte size for one or more of the I/O requests in the queue. If two or more I/O requests correspond to memory locations on disk that are within a threshold distance, the I/O scheduler can override the fairness algorithm to more efficiently process those requests. The I/O scheduler can employ other techniques in addition to or in place of those already described. In one embodiment, applications or processes in computing system 100 can be provisioned with certain quality of service (QoS) guarantees. For example, application 1 may be guaranteed a certain amount of I/O throughput to storage system 116. The I/O scheduler can monitor I/O requests from thread t1 to ensure that the I/O throughput guaranteed for application 1 is met. To meet the QoS guarantee for application 1, the I/O scheduler may submit multiple requests from process queue 132 when selecting requests in a round-robin fashion from the I/O queue.

Figure 3:
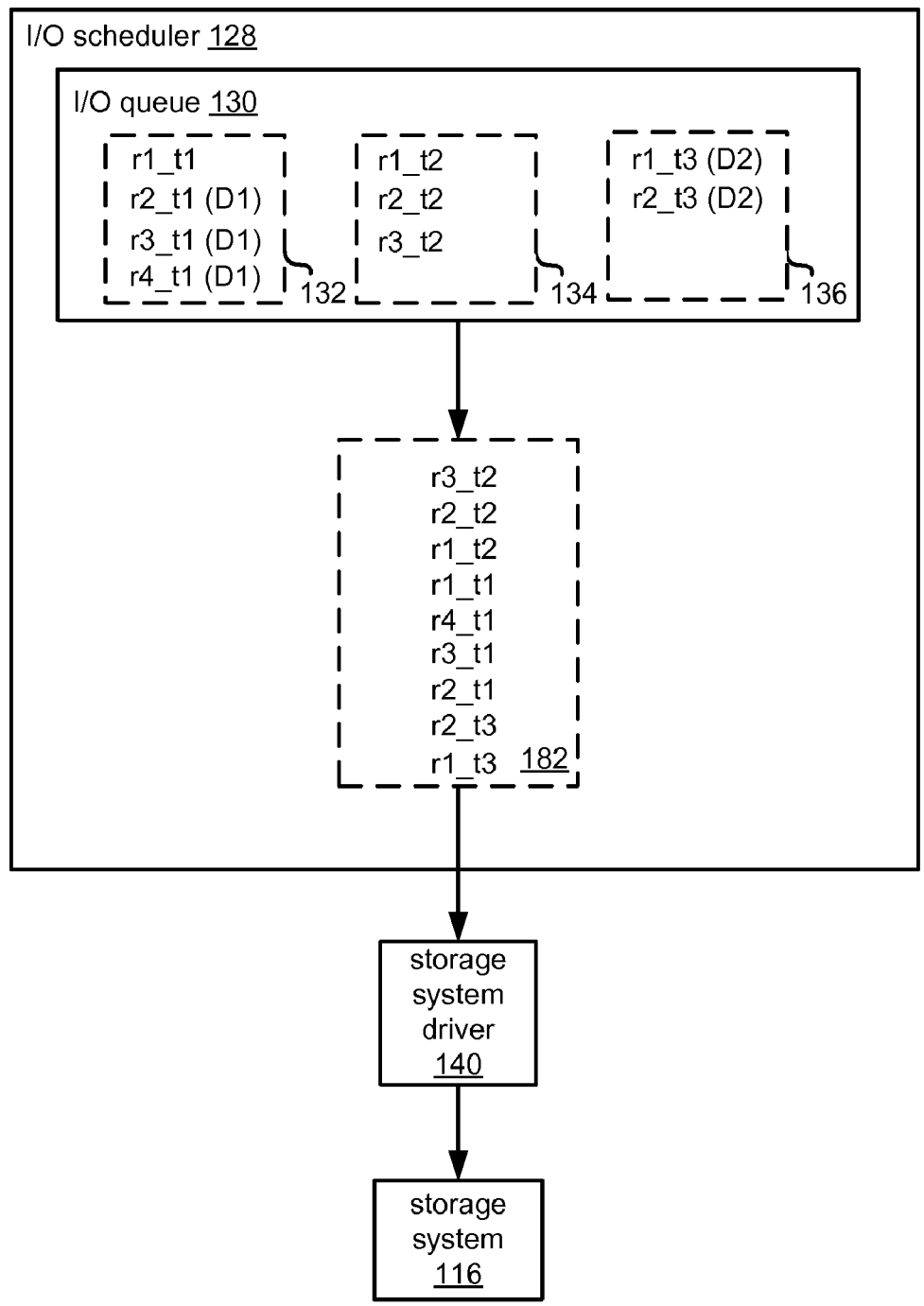
FIG. 3 is a block diagram of a computing system illustrating an exemplary second scheduling operational mode for a resource scheduler in accordance with one embodiment.

FIG. 3 illustrates a second operational mode 182 of I/O scheduler 128 in accordance with one embodiment. In the second operational mode, referred to as a dependency acceleration mode, I/O scheduler 128 considers whether pending I/O requests are associated with dependent transactions in making scheduling decisions. If there are dependent I/O requests outstanding, the I/O scheduler attempts to complete the I/O requests for one or more selected transactions in an effort to free the corresponding processes for further execution. In the depicted example, I/O scheduler 128 accesses the I/O requests and determines that requests r2_t1, r3_t1 and r4_t1 include dependent transaction identifier D1 identifying the requests as part of a first dependent transaction. The I/O scheduler determines that requests r1_t3 and r2_t3 include dependent transaction identifier D2 identifying the requests as part of a second dependent transaction. Based on the dependent transaction information, the I/O scheduler provides each I/O request of transaction D1 and transaction D2 to the storage system 116 first. In the depicted example, I/O requests r1_t3 and r2_t3 corresponding to the second dependent transaction are provided to the storage system first. Next, I/O requests r2_t1, r3_t1 and r4_t1 corresponding to the first dependent transaction are provided to the storage system. After providing all of the I/O requests corresponding to the dependent transactions, the I/O scheduler provides request r1_t1 for thread t1, followed by requests r1_t2, r2_t2 and r3_t2 for thread t2.

When more than one dependent transaction is represented in the I/O queue, the I/O scheduler may utilize a dependency weight measure to determine the order in which the different dependent transaction I/O requests should be scheduled. In one embodiment, the dependency weight measure for a dependent transaction is based on the ratio of an expected increase in system performance to the cost associated with completing the dependent transaction. The I/O requests for dependent transactions having higher dependency weight measures are provided before the I/O requests for dependent transactions having lower dependency weight measures. The expected increase in system performance that will result from completing a dependent transaction can be determined from the expected increase in CPU utilization that will result from enabling the further execution of the thread waiting for completion of the dependent transaction. The cost associated with completing a dependent transaction can be determined using the costs of the remaining I/O requests for the dependent transaction. In one embodiment, the cost of an I/O request includes an I/O cost component adjusted by a deviation from fairness component. The overall dependent transaction cost can be determined by taking the sum of the various cost components for each I/O request. This value is compared against the expected increase in system performance to obtain the dependency weight measure associated with the transaction. In an alternate embodiment, dependent transaction costs can be used to determine a scheduling order for dependent I/O requests without considering the effective increase in system performance associated with completion of the dependent transaction. The I/O requests corresponding to lower cost dependent transactions can be scheduled for submission prior to the I/O requests corresponding to higher cost dependent transactions. More details regarding transaction costs and dependency weight measures are described with respect to FIGS. 6 and 7.

Figure 4:
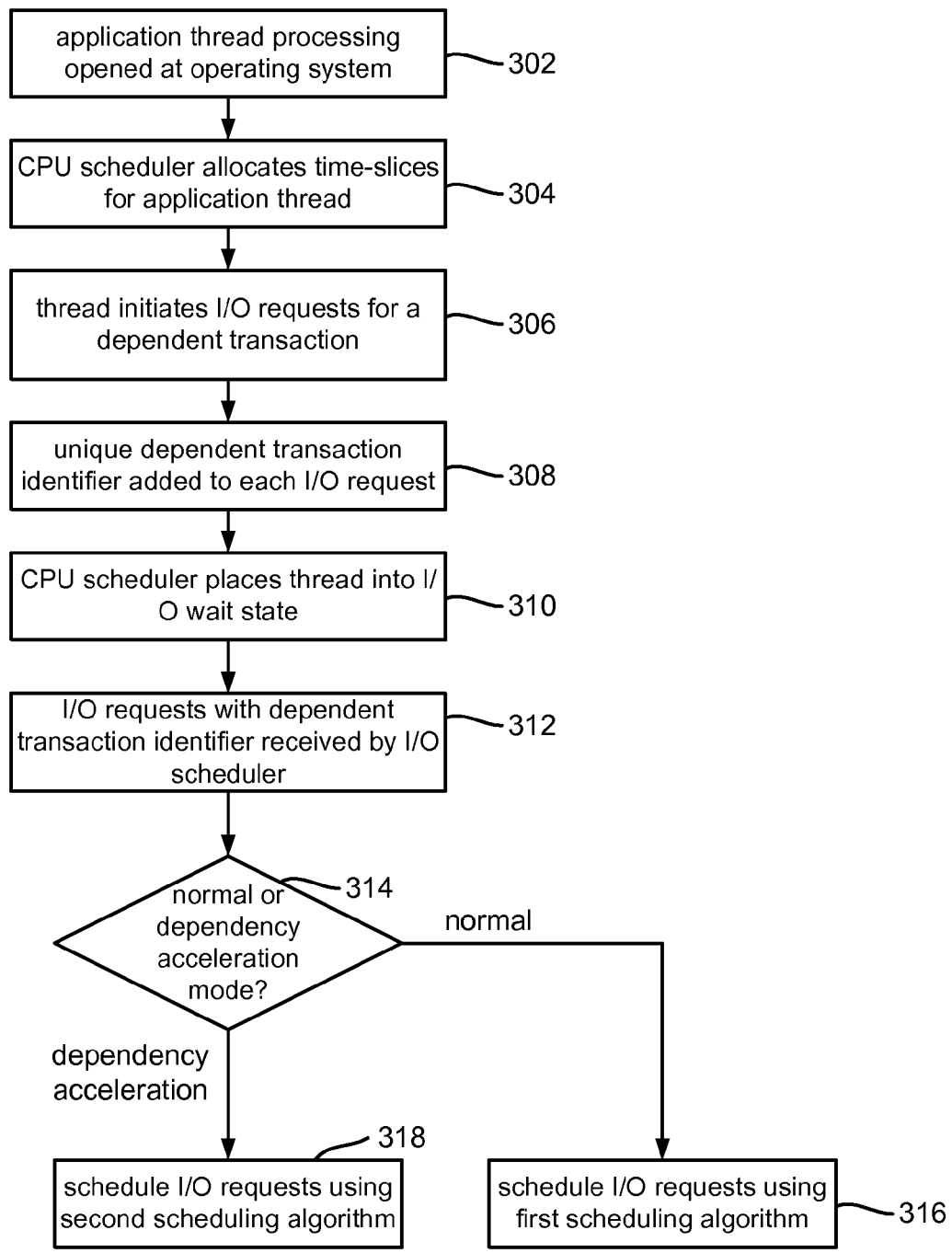
FIG. 4 is a flowchart describing a high-level method in accordance with one embodiment of the disclosed technology that is performed as part of scheduling I/O requests for physical memory in a computing system.

FIG. 4 is a flowchart describing a high-level method in accordance with one embodiment of the disclosed technology that is performed as part of scheduling I/O requests for physical memory in a computing system. FIG. 4 describes an exemplary implementation of the disclosed methodology in connection with I/O requests for a physical memory. The described technique is not limited to I/O requests or physical memories and may be utilized to schedule requests for other physical resources in computing systems. For example, the disclosed methodology can be applied in one embodiment to schedule requests for network resources, such as requests for content that is remotely accessible from one or more servers over a network connection.

The method begins at step 302 with the initiation of processing for an application thread under the control an operating system for the computing system. Other application threads may already be open at the time the application thread is opened at step 302. Moreover, additional application threads may also be opened after the application thread is opened at step 302. At step 304, the CPU scheduler for the operating system allocates processing windows or time-slices to the thread opened at step 302.

At step 306, the application thread initiates I/O requests for the physical memory that correspond to a dependent transaction. The application thread may submit the individual dependent I/O requests directly or the operating file system may generate and submit the individual dependent I/O requests in response to an I/O job submitted by the application thread. At step 308, a unique dependent transaction identifier is added to each of the I/O requests that correspond to the dependent transaction. The unique identifier indicates that the I/O requests are part of a dependent transaction and identifies the dependent transaction of which they are part. The identifier can be added to the I/O requests by the application thread when issuing the dependent I/O requests in one example. In another example, the file system adds the dependent transaction identifier to the I/O requests. The file system can add the dependent transaction identifier to I/O requests that are issued directly by the application and can also add the dependent transaction identifier to I/O requests that the file system generates to fulfill an I/O job submitted by the application thread.

At step 310, the application thread is placed into an I/O wait state by the CPU scheduler pending completion of the dependent transaction, including each dependent I/O request associated with the transaction. In other embodiments, the CPU scheduler may not actively place the tread into an I/O wait state pending completion of the transaction. However, the application thread will nevertheless remain idle until the I/O requests complete so that it can further execute. At step 312, one or more I/O requests having the dependent transaction identifier are received by the I/O scheduler for the physical memory and placed into an I/O queue. At step 314, the I/O scheduler determines whether it is to schedule I/O requests in normal mode or dependency acceleration mode. The CPU scheduler can provide an instruction to the I/O scheduler to switch between scheduling modes. The I/O scheduler can switch modes independently in another embodiment by determining the state of the CPU scheduler which can be exposed by the CPU scheduler via a shared data structure or function interface. In one embodiment, the I/O scheduler can check a flag to determine the appropriate mode of operation. The CPU scheduler determines the appropriate mode of operation in one embodiment as described below and sets the flag at the I/O scheduler accordingly. If the normal scheduling mode is to be used, the I/O scheduler schedules and submits the I/O requests to the physical memory at step 316 using a first scheduling algorithm. If the dependency acceleration scheduling mode is to be used, the I/O schedulers schedules and submits the I/O requests to the physical memory at step 318 using a second scheduling algorithm.

Figure 5:
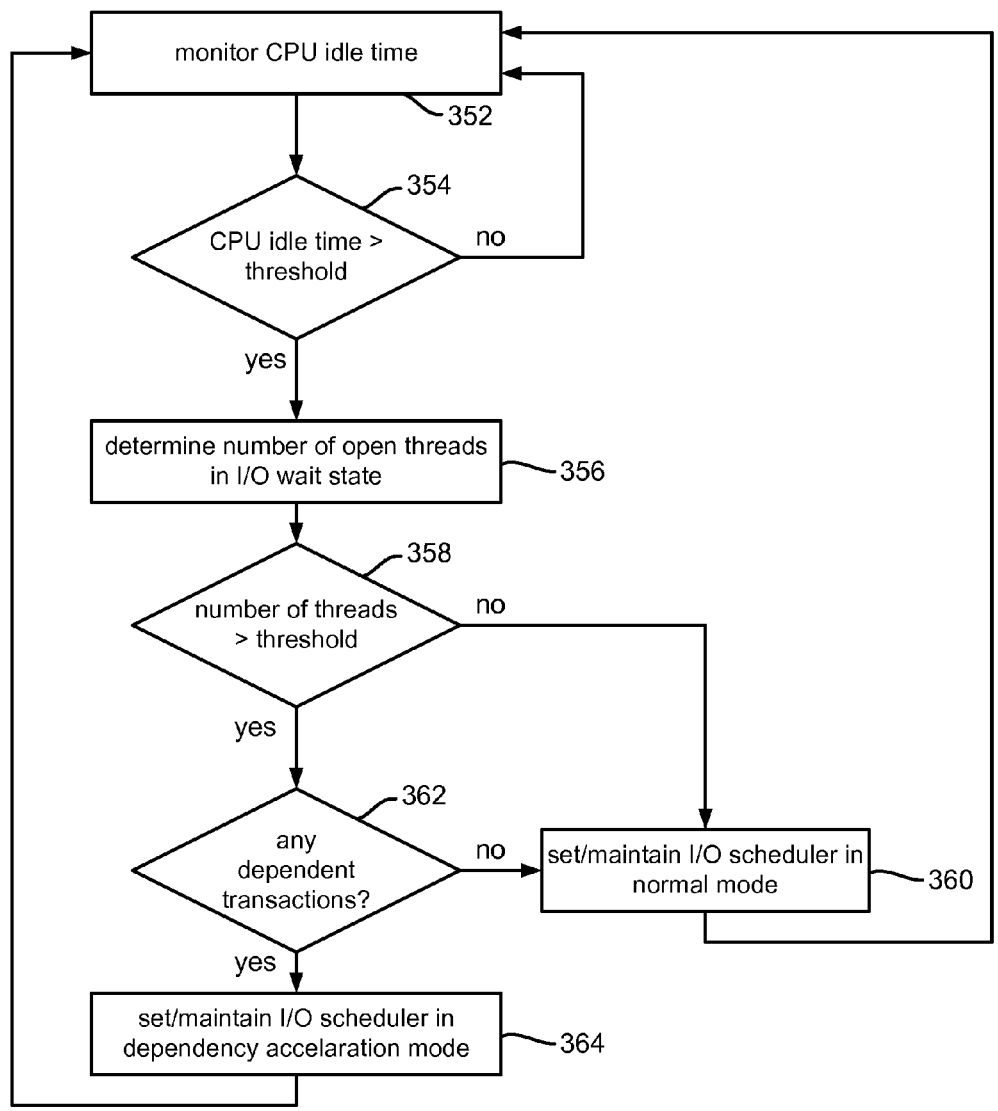
FIG. 5 is a flowchart describing a method in accordance with one embodiment for transitioning a resource scheduler between a normal mode and dependency acceleration mode to schedule I/O requests for physical memory.

FIG. 5 is a flowchart describing a method in accordance with one embodiment for transitioning an I/O scheduler between a normal mode and dependency acceleration mode to schedule I/O requests for physical memory. While FIG. 5 continues with an exemplary I/O request embodiment, the described technique is not so limited and may be utilized to transition other resource schedulers between operational modes for scheduling request to other physical resources. At step 352, the CPU scheduler monitors the central processing unit to determine an amount of time the CPU has been idle. At step 354, the CPU scheduler determines whether the CPU has been idle for more than a threshold time period. If the CPU has not been idle for longer than the threshold time period, the CPU scheduler continues monitoring the CPU idle time at step 352. If the CPU has been idle for longer than the threshold time period, the CPU scheduler determines the number of open threads in an I/O wait state at step 356. At step 358, the CPU scheduler compares the number of open threads with a threshold number. If the number of open threads is not greater than the threshold number, the CPU scheduler sets or maintains the I/O scheduler in normal mode at step 360. The CPU scheduler sets a flag to indicate the operational mode that should be used in one embodiment. If the I/O scheduler is to be maintained in normal mode, the CPU scheduler maintains the flag in its current state. If the I/O scheduler is currently in dependency acceleration mode, the I/O scheduler updates the flag to indicate that the normal scheduling mode should be used.

If the number of open threads in the I/O wait state is greater than the threshold number, the CPU scheduler determines at step 362 whether any of the threads have outstanding dependent transactions waiting for completion. If there are no dependent transactions waiting for completion, the CPU scheduler sets or maintains the I/O scheduler in normal mode at step 360. If there are outstanding dependent transactions, the CPU scheduler sets or maintains the I/O scheduler in dependency acceleration mode at step 364. After setting or maintaining the I/O scheduler into the appropriate mode at step 360 or 364, the method returns to step 352 where the CPU scheduler monitors the CPU idle time.

Variations for transitioning the I/O scheduler between operational modes are possible. In one embodiment for example, the CPU scheduler can simply monitor the number of threads and determine whether there are outstanding dependent transactions as depicted in steps 356 to 364 without monitoring the CPU idle time. The decision to switch modes will be made on the basis of the number of open threads and whether there are outstanding dependent transactions. In another embodiment, the CPU scheduler can change the I/O scheduler to dependency acceleration mode based only on the existence of outstanding dependent transactions as determined at step 362. In yet another embodiment, the I/O scheduler is switched from dependency acceleration mode to normal mode automatically whenever all outstanding dependent transactions are completed.

Figure 6:
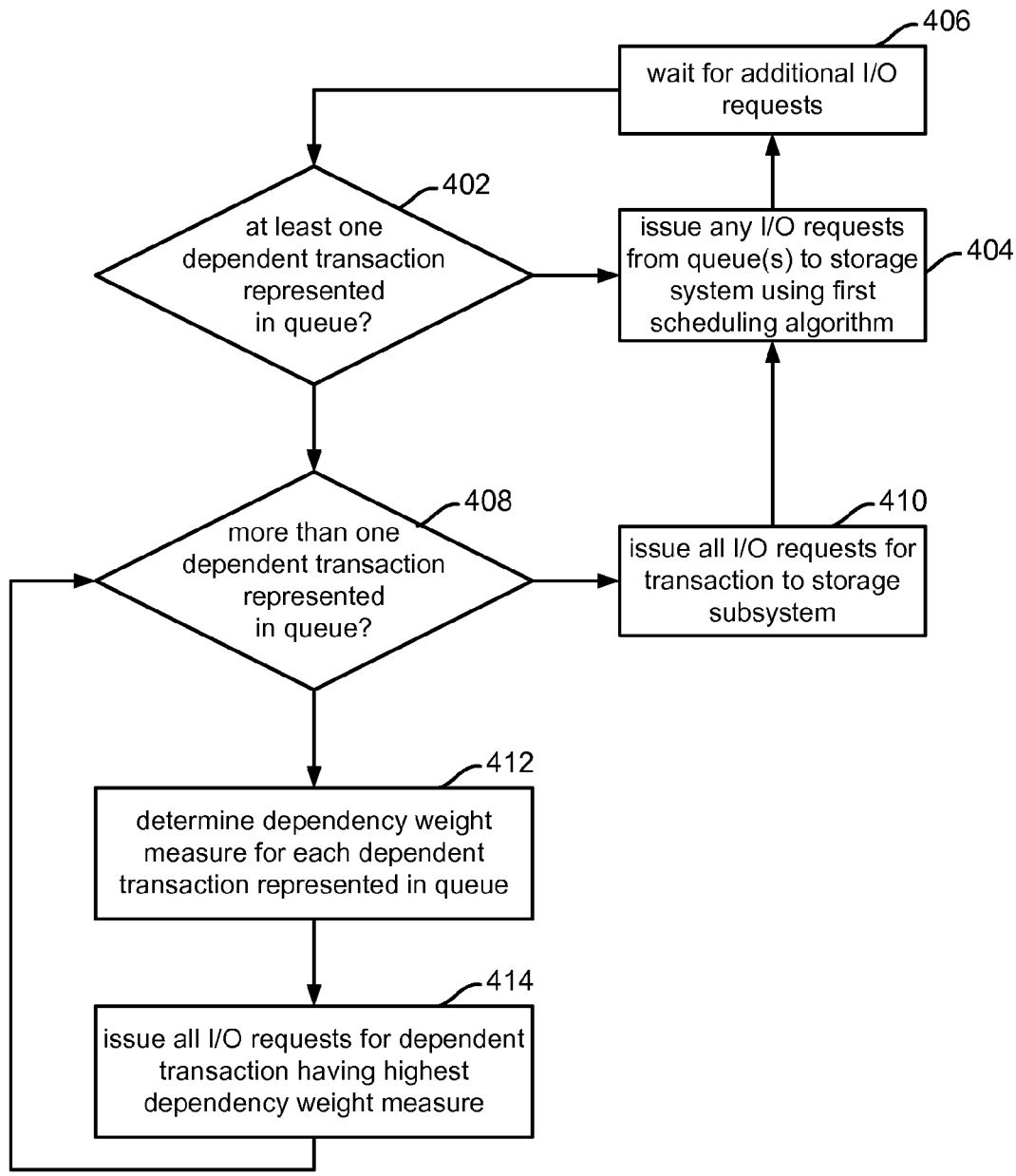
FIG. 6 is a flowchart describing the scheduling of I/O requests by an I/O scheduler in one embodiment when the I/O scheduler is in a dependency acceleration mode.

FIG. 6 is a flowchart describing the scheduling of I/O requests by the I/O scheduler in one embodiment when the I/O scheduler is in dependency acceleration mode. Again, while FIG. 6 describes an exemplary embodiment with respect to I/O scheduling and physical memory, the described techniques can be used with other resource schedulers and physical resources.

At step 402, the I/O scheduler accesses the I/O queue and determines whether there is at least one dependent transaction represented in the queue. If there are no I/O requests with dependent transaction identifiers, the I/O scheduler schedules and submits any I/O requests in the I/O queue using the first scheduling algorithm for the normal operational mode at step 404. The I/O scheduler can utilize fairness, physical memory utilization, I/O throughput and/or QoS factors in determining the scheduling order. After submitting all I/O requests in the queue, the I/O scheduler waits for additional I/O requests at step 406.

If there is at least one dependent transaction, the method branches at step 408 based on the number of dependent transactions. If there is a single dependent transaction represented in the queue, the I/O scheduler gives priority to each I/O request for that transaction before other I/O requests. The I/O scheduler issues all I/O requests for the dependent transaction to the physical memory at step 410. After issuing all I/O requests for the dependent transaction, the I/O scheduler issues any non-dependent transaction I/O requests in the I/O queue at step 404 based on the first scheduling algorithm. After issuing any remaining I/O requests or if there are no more I/O requests, the I/O scheduler waits for additional I/O requests at step 406.

If there is more than one dependent transaction represented in the I/O queue, the I/O scheduler determines an order in which to issue the I/O requests to the physical memory. In one embodiment, all of the I/O requests for a selected transaction are submitted to the physical memory prior to submitting the I/O requests for a different transaction. Submitting each I/O request for a selected transaction will release the corresponding application thread by the CPU scheduler for further processing to provide an overall improvement in system utilization. Different techniques can be used to select an order for processing transactions. For example, the I/O scheduler can select dependent transactions at random or use a first-in/first-out technique to maintain I/O throughput.

In the embodiment described in FIG. 6, the I/O scheduler determines a dependency weight measure for each dependent transaction represented in the I/O queue at step 412. The dependency weight measure provides an assessment of the overall effect that scheduling a particular transaction is expected to have on system performance. Different factors and techniques can be used to determine the dependency weight measure. One example includes a ratio of the expected improvement in system performance resulting from a transaction's completion to the cost of completing the transaction. Another example uses the cost of completing a transaction alone as the basis for the dependency weight measure. More details regarding dependency weight measures are described in FIG. 7.

At step 414, the I/O scheduler issues each I/O request for the dependent transaction with the highest dependency weight measure. After submitting each I/O request, the scheduler process to step 408 and determines whether there is one or more than one dependent transaction remaining in the queue. If multiple dependent transactions remain represented in the queue, the I/O scheduler can recalculate the dependency weight measures for each transaction at step 412 or use the measures from an earlier iteration. It is noted that additional I/O requests can be added to the queue at anytime which can potentially affect the measures. Recalculating, while not necessary, can provide an updated measure based on the new transactions added to the queue.

Figure 7:
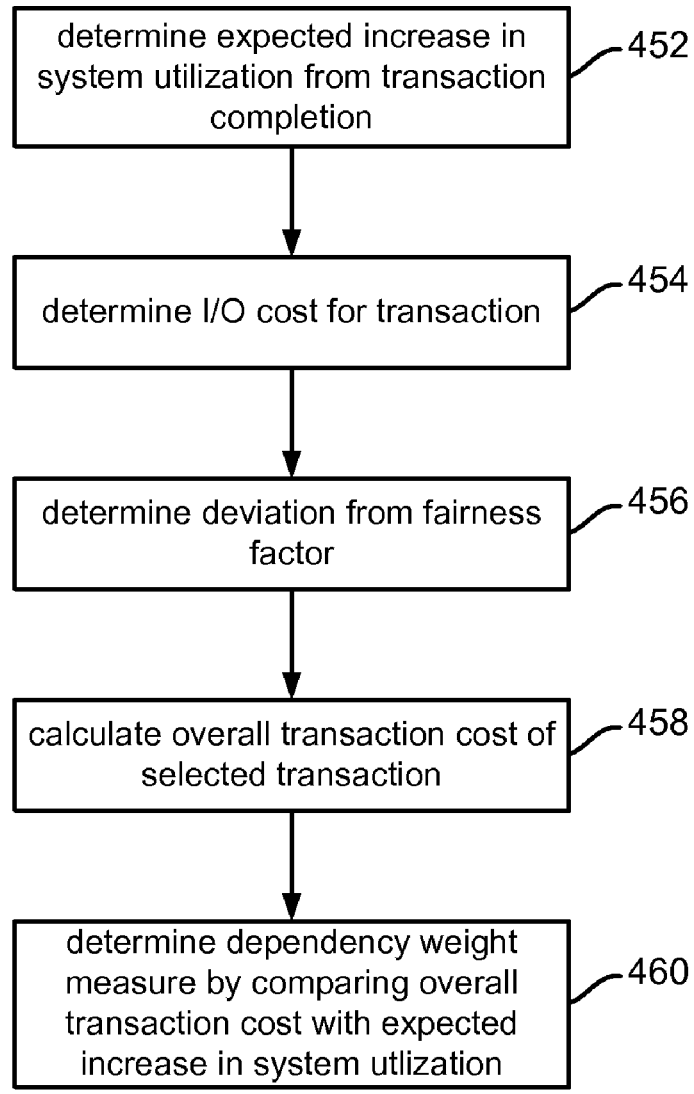
FIG. 7 is a flowchart describing one embodiment for determining the dependency weight measure for a dependent transaction.

FIG. 7 is a flowchart depicting an exemplary embodiment for determining the dependency weight measure for a dependent transaction. At step 452, an increase in system utilization that is expected to result from completing the dependent transaction is determined. In one embodiment, the CPU utilization that will result from the transaction's completion is determined at step 452. The resulting CPU utilization is based on the corresponding application thread's CPU utilization that will result from removing the tread from the I/O wait state.

In one embodiment, the CPU utilization that will result from a transaction's completion is determined by leveraging native CPU scheduler priority mechanisms. CPU schedulers typically employ priority-based scheduling of the CPU resources based on a priority associated with pending threads or processes. Each pending thread may be assigned a priority by the CPU scheduler using different criteria. The CPU scheduler can assign priorities to maximize CPU resources, to provide fairness, and/or to meet quality of service guarantees to requesting applications, etc. The CPU scheduler may also assign priorities based on a priority designation received from the application issuing the thread. An expected increase in CPU utilization resulting from a transaction's completion can be determined from the CPU scheduler priorities assigned to the pending threads. The thread or process at the CPU scheduler corresponding to a selected dependent transaction is identified and its CPU scheduling priority determined. If the corresponding thread has a relatively high priority, it indicates that utilization of the CPU may be more crucial or important than if the thread has a relatively low priority. Accordingly, one embodiment assigns a measure of expected increase in CPU utilization to transactions that is proportional to the CPU priority for the transaction's corresponding thread. Transactions associated with higher priority threads are assigned larger measures of expected increase in CPU utilization than transactions associated with lower priority threads.

In another embodiment, expected increases in CPU utilization are determined by tracking empirical data associated with thread processing. Each thread at the CPU scheduler is monitored to assess its CPU utilization. When a dependent transaction is completed for a thread, the resulting CPU utilization by that thread can be determined and a measure of the utilization determined. The measure is stored in a data structure for that thread to be used later in determining expected increases in CPU utilization. Operating system kernels typically use a task or thread data structure to track various information about threads. This data structure is modified in one embodiment to include an empirical measure of the thread's CPU utilization after completing dependent transactions. The empirical data is a running measure updated after each dependent transaction completion for the thread. When the expected increase in CPU utilization resulting from an outstanding dependent transaction is to be determined, this empirical data is accessed to determine how past completions affected CPU utilization. The expected increase from the current transaction's completion is based on the resulting utilization from completion of past transactions.

Application threads initiating dependent transactions can also provide information regarding CPU utilization when issuing dependent transactions in one embodiment. As earlier described, a dependent transaction identifier is added to the resource requests, either by the issuing application thread or file system, for example. An issuing application can further add information as to how important the particular dependent transaction is to the application. In one embodiment, the application provides an indication as to how much the transaction's completion may be expected to increase CPU utilization. The information is added to the resource requests in one embodiment for use by the I/O scheduler. In another embodiment, the information is passed separately by the application and maintained by the I/O scheduler for use when scheduling the separately received resource requests. An issuing application can use different criteria to determine the expected increase in utilization. In one example, an application provides an indication proportional to how many additional dependent transactions the application expects to issue after the current transaction. If the application is likely to issue additional dependent transactions, completing the current transaction may not free the application for significant CPU utilization as the application will enter an additional I/O wait state for those additional transactions after the current transaction is completed. On the other hand, if the application is not likely to issue additional dependent transactions, completing the current transaction can be expected to have a more significant increase in CPU utilization. The application can provide a measure or indication as to the expected increase in utilization.

The I/O cost of the dependent transaction is determined at step 454. The I/O cost can be determined by adding together the I/O cost of each I/O request that forms the dependent transaction. The I/O cost of a request is a metric based on the size of the I/O request (e.g., number of bytes) and the disk seek time associated with the I/O request in one embodiment. The disk seek time can be estimated based on the distance between a current memory location on disk and a memory start location for a particular I/O request. At step 456, a deviation from fairness factor for the dependent transaction is determined. The deviation from fairness factor is a measure of the cost to deviate from normal scheduling to schedule a particular transaction immediately. In one embodiment, the deviation from fairness is a function of the quality of service a given transaction is entitled to versus the quality of service it will receive if it is given scheduling priority. The difference in a transaction's guaranteed quality of service and the currently observed quality of service can be used to determine the factor in one embodiment. In another example, the deviation from fairness factor can be determined by comparing the I/O requests of the dependent transaction against the requests that would be scheduled according to the first scheduling algorithm. The factor can be determined as the difference between the quality of service for the transaction and the quality of service of the I/O requests that would be scheduled in normal mode. The difference in wait time between the I/O requests of the transaction and those that would normally be scheduled can be added to the difference in quality of service between the requests to determine the deviation factor in another embodiment. Tuning coefficients can be used to adjust the quality of service difference measurement and/or wait time measurement for any of the above deviation factor calculations.

At step 458, the I/O cost for the transaction determined at step 454 is adjusted using the deviation from fairness factor to determine an overall transaction cost. The product of the I/O cost measure and deviation factor is used to determine an overall transaction cost in one embodiment. At step 460, the final dependency weight measure is determined by comparing the overall transaction cost with the expected increase in system utilization resulting from the transaction's completion. A ratio of the two values can be used for the final dependency weight measure in one embodiment.

Figure 8:
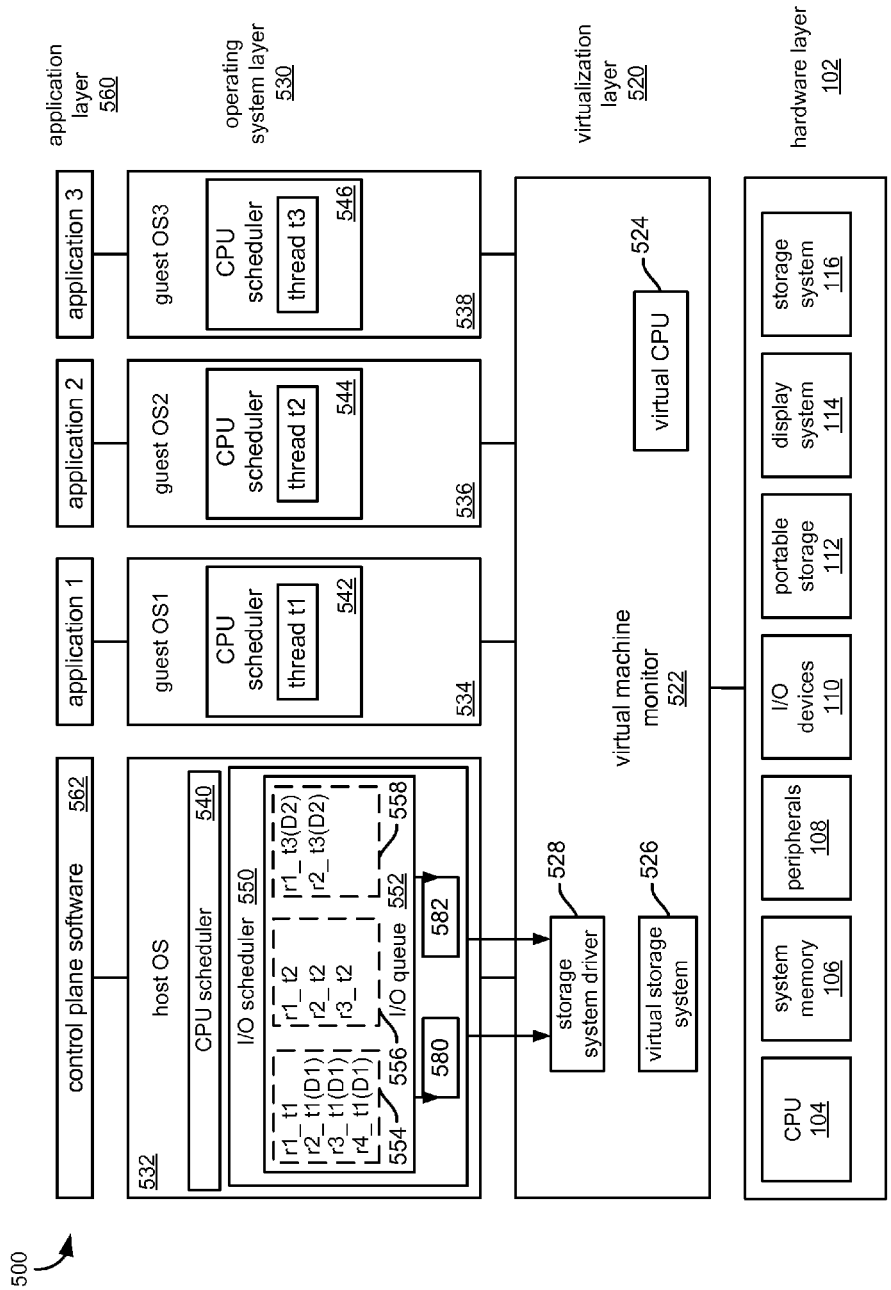
FIG. 8 is a block diagram depicting an embodiment of the disclosed technology in a virtualized computing system.

FIG. 8 is a block diagram depicting an embodiment of the disclosed technology in a virtualized computing system 500. The hardware layer 102 in FIG. 8 is as described with respect to FIG. 1, including CPU 104, system memory 106, peripherals 108, I/O devices 110, portable storage 112, display system 114 and storage system 116. As with FIG. 1, other embodiments may not include all of the depicted hardware components and/or may include additional hardware components.

A virtualization layer 520 interfaces between hardware layer 102 and the software layers to present the hardware layer to multiple operating systems such that each operating system appears to have direct access to the resources made available to it. The virtualization layer includes a virtual machine monitor 522 (VMM) the enables software applications to run in isolated environments on the shared hardware layer. The VMM itself is a software layer running on the hardware layer that provides an abstraction of the computing system to the software layers. VMM 522 includes virtualized versions of the hardware resources that are shared at the operating system layer. The shared CPU resource 104 is virtualized and presented to the guest operating systems as virtual CPU 524. The shared storage system 116 is virtualized and presented to the guest operating systems as virtual storage system 526. Other resources in the hardware layer 102 can be virtualized in other examples.

The operating system layer 530 includes a host operating system 532 and a plurality of guest operating systems 534, 536 and 538. The guest operating systems reside in individual domains or environments and each includes a CPU scheduler to manage CPU processing for the applications executing at the guest OS. In the described example, application 564 is executing at guest OS1 534 and initiates thread t1 for processing under the control of CPU scheduler 542. Application 566 is executing at guest OS2 536 and initiates thread t2 for processing under the control of CPU scheduler 544. Application 568 is executing at guest OS3 538 and initiates thread t3 for processing under the control of CPU scheduler 546.

Host operating system 532 resides in a privileged management domain. Control plane software 562 executes on host operating system 532 to provide management functionality for its domain. Host OS 532 includes direct access to select physical resources at the hardware layer. In the described example, storage system 116 is virtualized at the virtualization layer as virtual physical memory 526. Host OS 532 accesses the virtual physical memory 526 via device driver 528. Although driver 528 is shown in the virtualization layer, in some embodiments drivers for shared resources are placed directly in the privileged management domain. In either case, the guest OS's of the non-privileged domains access the virtual physical memory 526 and device driver 528 through privileged domain 532. Host OS 532 includes I/O scheduler 550 for managing I/O requests for submission to virtual physical memory 526.

Similar to FIG. 1, application thread t1 submits I/O requests r1_t1, r2_t1, r3_t1 and r4_t1 for processing by the storage system 116. The I/O requests are received by I/O scheduler 550 at the privileged management domain. I/O scheduler 550 places the I/O requests in I/O queue 552 for submission to the storage system. I/O requests r2_t1, r3_t1 and r4_t1 include dependent transaction identifier D1 signifying that these requests are part of a first dependent transaction. The identifier may be added to individual I/O requests by application thread t1 when those I/O requests are submitted. The file system (not shown) at guest operating system 534 may also add dependent transaction identifiers to I/O requests received by the application or those generated by the file system itself, such as I/O requests generated to fulfill an I/O job. Application thread t2 submits I/O requests r1_t2, r2_t2 and r3_t2 for processing by the storage system 116. Application thread t3 submits I/O requests r1_t3 and r2_t3 which both include dependent transaction identifier D2 for a second dependent transaction. As in FIG. 1, I/O queue 552 includes individual process queues 554, 556 and 558 but this is not necessary.

Submission of the individual I/O requests from the I/O scheduler to the storage system 116 proceeds as in the single operating system environment depicted in FIG. 1. The I/O scheduler utilizes two modes of operation to schedule I/O requests for submission. In the first mode, denoted by box 580, the I/O requests are processed as depicted in box 180 of FIG. 2 using a first scheduling algorithm. The scheduler uses a round-robin FIFO technique to select requests from the different process queues, selecting the oldest request from each process queue during each round-robin iteration. As earlier described, other techniques using I/O costs, I/O throughput and QoS can also be used for the first scheduling algorithm. In a second mode denoted by box 582, the I/O scheduler utilizes a dependency acceleration algorithm to prioritize I/O requests associated with dependent transactions. The I/O requests are processed as illustrated in box 182 of FIG. 3 in one embodiment. I/O requests from selected dependent transactions are given priority and processed before processing other I/O requests to free the application thread of the transaction for further processing.

Embodiments in accordance with the present disclosure can be accomplished using hardware, software or a combination of both hardware and software. The software can be stored on one or more processor readable storage devices such as hard disk drives, CD-ROMs, DVDs, optical disks, floppy disks, tape drives, RAM, ROM, flash memory or other suitable storage device(s). In alternative embodiments, some or all of the software can be replaced by dedicated hardware including custom integrated circuits, gate arrays, FPGAs, PLDs, and special purpose processors. In one embodiment, software (stored on a storage device) implementing one or more embodiments is used to program one or more processors. The one or more processors can be in communication with one or more storage devices, peripherals and/or communication interfaces.

The foregoing detailed description has been presented for purposes of illustration and description. It is not intended to be exhaustive or to limit the claimed technology to the precise forms disclosed. Many modifications and variations are possible in light of the above teachings. The described embodiments were chosen in order to best explain the principles of the disclosed technology and its practical application to thereby enable others skilled in the art to best utilize it in various embodiments and with various modifications as are suited to the particular use contemplated. It is intended that the scope of the invention be defined by the claims appended hereto.

What is claimed is:

1. A method of managing input/output (I/O) requests for physical resources in computing systems, comprising:
  receiving from a file system of an operating system a first plurality of I/O requests at an I/O scheduler of the operating system for one or more storage systems, the first plurality of I/O requests from the file system each including a first identifier indicating that the I/O requests of the first plurality are part of a first dependent transaction;
  receiving from the file system of the operating system a second plurality of I/O requests at the I/O scheduler;
  determining that the I/O requests of the first plurality are part of the first dependent transaction using the first identifier and determining that the I/O requests of the second plurality are not part of a dependent transaction; and
  based on the first identifier, providing by the I/O scheduler the first plurality of I/O requests to the one or more storage systems prior to providing the second plurality of I/O requests to the one or more storage systems based on the first identifier.

2. The method of according to claim 1, further comprising:
  receiving a third plurality of I/O requests at the I/O scheduler, the third plurality of I/O requests including a second identifier indicating that the I/O requests of the third plurality are part of a second dependent transaction;
  determining that the I/O requests of the third plurality are part of the second dependent transaction at the I/O scheduler using the second identifier;
  calculating a first transaction cost for the first dependent transaction;
  calculating a second transaction cost for the second dependent transaction;
  sending the first plurality of I/O requests under the control of the I/O scheduler to the one or more storage systems prior to sending the third plurality of I/O requests to the one or more storage systems if the first transaction cost is lower than the second transaction cost; and
  sending the third plurality of I/O requests under the control of the I/O scheduler to the one or more storage systems prior to providing the first plurality of I/O requests to the one or more storage systems if the second transaction cost is lower than the first transaction cost.

3. The method of claim 2, wherein:
  calculating the first transaction cost includes determining a first I/O cost for the first dependent transaction, determining a first deviation from fairness factor for the first dependent transaction, and adjusting the first I/O cost using the first deviation from fairness factor; and
  calculating the second transaction cost includes determining a second I/O cost for the first transaction, determining a second deviation from fairness factor for the second dependent transaction, and adjusting the second I/O cost using the second deviation from fairness factor.

4. The method of claim 3, wherein:
  the one or more storage systems includes a non-volatile storage system; and
  the I/O requests of the first plurality and the second plurality designate the non-volatile storage system.

5. The method of claim 4, wherein:
  determining the first I/O cost for the first dependent transaction includes determining a first seek time and a first size of each I/O request of the first dependent transaction; and
  determining the second I/O cost for the second dependent transaction includes determining a second seek time and a second size of each I/O request of the second dependent transaction.

6. The method of claim 1, further comprising:
  receiving at the file system the first plurality of I/O requests including the first identifier from an application thread that is allocated processing windows by a CPU scheduler of the operating system.

7. The method of claim 6, wherein the first dependent transaction is associated with a first process, the method further comprising:
  adding to the first plurality of I/O requests an identification of importance of the first dependent transaction to the first process.

8. The method of claim 6, wherein the first dependent transaction is an I/O job, the method further comprising:
  receiving the I/O job at the file system;
  generating by the file system the first plurality of I/O requests in response to receiving the I/O job, wherein generating the first plurality of I/O requests includes adding the first identifier; and
  sending the first plurality of I/O requests to the I/O scheduler.

9. A method of scheduling requests for resources in computing systems, comprising:
  generating by a plurality of threads under control of a central processing unit (CPU) scheduler of an operating system a plurality of resource requests designating one or more physical resources, the plurality of resource requests including two or more resource requests that are part of a dependent transaction and at least one additional resource request;
  adding by a file system of the operating system a dependent transaction identifier to the two or more resource requests; and
  providing the plurality of resource requests to a resource scheduler of the operating system associated with the one or more physical resources.

10. The method of claim 9, further comprising:
  receiving the plurality of resource requests at the resource scheduler;
  determining from the dependent transaction identifier that the two or more resource requests are part of the dependent transaction and that the at least one additional resource request is not part of the dependent transaction; and
  providing the two or more resource requests to the one or more physical resources prior to providing the at least one additional resource request to the one or more physical resources based on determining that the two or more resource requests are part of the dependent transaction.

11. The method of claim 10, wherein:
  the dependent transaction is an I/O job;
  the method further comprises receiving the I/O job at the file system; and
  generating the plurality of resource requests includes generating the two or more resource requests by the file system in response to receiving the I/O job.

12. A method of scheduling requests for resources in computing systems, comprising:
  receiving a plurality of resource requests including a first set of two or more resource requests having a first dependent transaction identifier, a second set of two or more resource requests having a second dependent transaction identifier, and at least one resource request not having a dependent transaction identifier, the plurality of resource requests designating one or more physical resources;
  queuing the plurality of resource requests;
  determining from the first dependent transaction identifier that the first set of two or more resource requests is part of a first dependent transaction, from the second dependent transaction identifier that the second set of two or more resource requests is part of a second dependent transaction, and that the at least one resource request is not part of a dependent transaction;
  calculating a first dependency weight measure for the first dependent transaction, the first dependency weight measure comprising a first ratio of a first expected increase in processor utilization resulting from completion of the first dependent transaction to a first cost associated with completing the first dependent transaction;
  calculating a second dependency weight measure for the second dependent transaction, the second dependency weight measure comprising a second ratio of a second expected increase in processor utilization resulting from completion of the second dependent transaction to a second cost associated with completing the second dependent transaction;
  providing the at least one resource request to the one or more physical resources after the first set of two or more resource requests and the second set of two or more resource requests based on determining that the at least one resource request is not part of a dependent transaction;
  providing the first set of two or more resource requests to the one or more physical resources prior to providing the second set of two or more resource requests to the one or more physical resources if the first dependency weight measure is greater than the second dependency weight measure; and
  providing the second set of two or more resource requests to the one or more physical resources prior to providing the first set of two or more resource requests to the one or more physical resources if the second dependency weight measure is greater than the first dependency weight measure.

13. The method of claim 12, wherein:
  receiving the plurality of resource requests includes receiving the two or more resource requests having the dependent transaction identifier from a first application process and receiving the at least one resource request from a second application process.

14. The method of claim 12, wherein:
  the one or more physical resources is a non-volatile storage system;
  the plurality of resource requests is a plurality of I/O requests designating the non-volatile storage system;
  the two or more resource requests of the first set are two or more I/O requests; and
  the at least one resource request is at least one I/O request.

15. The method of claim 14, wherein the first dependent transaction is an I/O job designating the non-volatile storage system, the method further comprising:

receiving the I/O job at a file system from a first application process;

generating the two or more I/O requests of the first set to fulfill the I/O job; and adding the first dependent transaction identifier to the two or more I/O requests, wherein receiving the plurality of I/O requests includes receiving the plurality of I/O requests from the file system.

16. The method of claim 12, wherein:

the one or more physical resources includes one or more physical resources accessible over a first network;

the plurality of resource requests is a plurality of requests designating the one or more physical resources; and providing the two or more resource requests includes providing the two or more requests to the first network.

17. The method of claim 12, further comprising:

determining a first expected increase in processor utilization resulting from completion of the first dependent transaction by determining a first CPU scheduling priority for a first process associated with the first dependent transaction; and determining a second expected increase in processor utilization resulting from completion of the second dependent transaction by determining a second CPU scheduling priority for a second process associated with the second dependent transaction.

18. The method of claim 12, wherein the plurality of resource requests is a first plurality of resource requests, the method further comprising:

determining a first increase in processor utilization resulting from completion of the first dependent transaction, the first dependent transaction is associated with a first process;

determining a second increase in processor utilization resulting from completion of the second dependent transaction, the second dependent transaction is associated with a second process;

maintaining an indication of the first increase in processor utilization and the second increase in processor utilization;

receiving a second plurality of resource requests, the second plurality of resource requests including a third set of resource requests and a fourth set of resource requests, the third set of resource requests being part of a third dependent transaction and having a third dependent transaction identifier, the fourth set of resource requests being part of a fourth dependent transaction and having a fourth dependent transaction identifier, the third dependent transaction being associated with the first process and the fourth dependent transaction being associated with the second process;

calculating a third dependency weight measure for the third dependent transaction using the indication of the first increase in processor utilization resulting from completion of the first dependent transaction; and calculating a fourth dependency weight measure for the fourth dependent transaction using the indication of the second increase in processor utilization resulting from completion of the second dependent transaction.

19. One or more processor readable non-transitory storage devices having processor readable code embodied on said one or more processor readable storage devices, said processor readable code for programming one or more processors to perform a method comprising:

receiving a plurality of I/O requests designating one or more physical resources, the plurality of I/O requests including a first set of I/O requests having a first dependent transaction identifier and a second set of I/O requests having a second dependent transaction identifier;

queuing the plurality of I/O requests;

calculating a first dependency weight measure for the first dependent transaction, the first dependency weight measure is a first ratio of a first expected increase in processor utilization resulting from completion of the first dependent transaction to a first cost associated with completing the first dependent transaction;

calculating a second dependency weight measure for the second dependent transaction, the second dependency weight measure is a second ratio of a second expected increase in processor utilization resulting from completion of the second dependent transaction to a second cost associated with completing the second dependent transaction;

providing a first set of two or more resource requests to the one or more physical resources prior to providing a second set of two or more resource requests to the one or more physical resources if the first dependency weight measure is greater than the second dependency weight measure; and providing the second set of two or more resource requests to the one or more physical resources prior to providing the first set of two or more resource requests to the one or more physical resources if the second dependency weight measure is greater than the first dependency weight measure.

20. The one or more processor readable storage devices of claim 19, wherein receiving the plurality of I/O requests comprises receiving the plurality of I/O requests at an I/O scheduler for the one or more physical resources, the method further comprising, prior to receiving the plurality of I/O requests at the I/O scheduler:

receiving the plurality of I/O requests at a file system;

adding the first dependent transaction identifier to the first set of two or more I/O requests of the plurality that are associated with the first dependent transaction; and providing the first set of two or more I/O requests with the first dependent transaction identifier to the I/O scheduler.

21. A computing system, comprising:

a central processing unit;

one or more physical resources in communication with the central processing unit;

an operating system executable by the central processing unit, the operating system including a CPU scheduler, a file system and an input/output (I/O) scheduler for providing I/O requests to the one or more physical resources, the CPU scheduler controls execution of one or more application threads that provide the I/O requests using the file system;

code for instructing the I/O scheduler to receive the I/O requests for the one or more physical resources from the file system and to determine whether each I/O request as received from the file system includes a dependent transaction identifier; and code for instructing the I/O scheduler to provide a set of two or more of the I/O requests having a common dependent transaction identifier to the one or more physical resources prior to providing ones of the I/O requests that do not include a dependent transaction identifier.

22. The computing system of claim 21, wherein the operating system includes a file system, the computing system further comprises:

code for instructing the file system to receive the I/O requests and determine whether each of the I/O requests is part of a dependent transaction; and code for instructing the file system to add the common dependent transaction identifier to the set of two or more I/O requests after determining that the two or more I/O requests are part of a first dependent transaction.

23. The computing system of claim 21, further comprising:
one or more applications executable by the central processing unit, the one or more applications add the common dependent transaction identifier to the set of two or more I/O requests when the two or more I/O requests are part of a first dependent transaction, the one or more applications provide the I/O requests to the I/O scheduler after adding the common dependent transaction identifier.

24. A method of scheduling requests for resources in computing systems, comprising:
receiving a plurality of requests for one or more physical resources in a computing system;
determining a measure of processor utilization in the computing system;
determining whether the measure of processor utilization is within a threshold utilization;
if the measure of processor utilization is within the threshold, providing the plurality of requests to the one or more physical resources in a first sequence; and
if the measure of processor utilization is outside of the threshold:
determining if individual requests of the plurality are associated with one or more dependent transactions, and;
providing the plurality of requests to the one or more physical resources in a second sequence, the providing includes providing requests of the plurality that are associated with the one or more dependent transactions prior to providing requests of the plurality that are not associated with the one or more dependent transactions.

25. The method of claim 24, wherein:
determining the measure of processor utilization comprises determining an amount of time a processor has been idle;
determining whether the measure of processor utilization is within the threshold comprises determining if the amount of time the processor has been idle is less than a threshold idle time;
the measure of processor utilization is within the threshold if the amount of time the processor has been idle is less than the threshold idle time; and
the measure of processor utilization is outside of the threshold if the amount of time the processor has been idle is greater than the threshold idle time.

26. The method of claim 24, wherein:
the one or more physical resources include a non-volatile storage system;
the plurality of requests is a plurality of I/O requests designating the non-volatile storage system;

providing the plurality of I/O requests to the non-volatile storage system in the first sequence includes:
determining an I/O cost of each I/O request in the plurality of I/O requests; and
sequentially providing the I/O requests to the non-volatile storage system based on the I/O cost beginning with a first I/O request having a lowest I/O cost and ending with a second I/O request having a largest I/O cost.

27. The method of claim 26, wherein:
determining if individual requests of the plurality are associated with the one or more dependent transactions includes determining that a first set of two or more I/O requests is associated with a first dependent transaction and that a second set of two or more I/O requests is associated with a second dependent transaction;
the method further comprises determining a first dependency weight measure for the first set of two or more I/O requests and determining a second dependency weight measure for the second set of two or more I/O requests; and
providing the plurality of requests to the one or more physical resources in the second sequence includes providing the first set of two or more I/O requests prior to providing the second set of two or more I/O requests if the first dependency weight measure is greater than the second dependency weight measure and providing the second set of two or more I/O requests prior to providing the first set of two or more I/O requests if the second dependency weight measure is greater than the first dependency weight measure.

28. The method of claim 24, wherein:
determining the measure of processor utilization is performed by a processor scheduler;
providing the plurality of resource requests to the one or more physical resources is performed by a resource scheduler associated with the one or more physical resources, the resource scheduler including a first operational mode and a second operational mode;
the method further comprises placing the resource scheduler into the second operational mode if the measure of processor utilization is not within the threshold and the resource scheduler is currently in the first operational mode, the second sequence being associated with the second operational mode.

29. The method of claim 28, further comprising:
placing the resource scheduler into the first operational mode if the measure of processor utilization is within the threshold and the resource scheduler is currently in the second operational mode, the first sequence being associated with the first operational mode.

30. The method of claim 28, further comprising:
placing the resource scheduler into the first operational mode if the resource scheduler is currently in the second operational mode and there are no outstanding resource requests for the one or more physical resources that are associated with a dependent transaction.

* * * * *